(12) United States Patent
Krieger et al.

(10) Patent No.: US 6,755,362 B2
(45) Date of Patent: Jun. 29, 2004

(54) IRRIGATION SYSTEM WITH VARIABLE SPEED DRIVE SYSTEM

(76) Inventors: Neal Krieger, 4802 W. Caro Rd., Vassar, MI (US) 48768; Doug Honsinger, 9545 Swan Valley Dr., Saginaw, MI (US) 48609; Leonard Walther, Jr., 5245 E. Hoppe Rd., Cass City, MI (US) 48726

( * ) Notice: Subject to any disclaimer, the term of this patent is extended or adjusted under 35 U.S.C. 154(b) by 248 days.

(21) Appl. No.: 09/970,564

(22) Filed: Oct. 4, 2001

(65) Prior Publication Data

US 2003/0066912 A1 Apr. 10, 2003

(51) Int. Cl.$^7$ .................................................. B05B 3/00
(52) U.S. Cl. ........................................ 239/731; 239/744
(58) Field of Search ........................... 239/69, 73, 729, 239/731, 744

(56) References Cited

U.S. PATENT DOCUMENTS

| | | | |
|---|---|---|---|
| 3,587,763 A | | 6/1971 | Kinkead ........................ 180/14 |
| 3,823,730 A | | 7/1974 | Sandstrom et al. .......... 137/344 |
| 3,952,769 A | * | 4/1976 | Ott ................................ 239/731 |
| 4,034,778 A | | 7/1977 | Sage et al. .................... 137/344 |
| 4,186,880 A | | 2/1980 | Jacobi et al. ................. 239/177 |
| 4,191,207 A | * | 3/1980 | Jacobi et al. ................. 239/731 |
| 4,266,732 A | | 5/1981 | Sage et al. .................... 239/720 |
| 4,290,556 A | | 9/1981 | McConnell ................... 239/177 |
| 4,303,203 A | | 12/1981 | Avery ............................ 239/710 |
| 4,340,183 A | | 7/1982 | Kegel et al. .................. 239/710 |
| 4,371,116 A | | 2/1983 | Sage et al. .................... 239/720 |
| 4,434,936 A | * | 3/1984 | Chapman et al. ............ 239/731 |
| RE31,838 E | | 2/1985 | Seckler et al. ............... 239/177 |
| 4,564,224 A | * | 1/1986 | Korus ........................... 285/272 |
| 4,580,731 A | * | 4/1986 | Kegel et al. .................. 239/731 |
| 4,763,836 A | | 8/1988 | Lyle et al. ...................... 239/69 |
| 4,878,614 A | * | 11/1989 | Hach et al. .................... 239/10 |
| 4,899,934 A | | 2/1990 | Krisle ............................. 239/1 |
| 5,255,857 A | * | 10/1993 | Hunt ............................. 239/731 |
| 5,613,641 A | | 3/1997 | Grothen ....................... 239/731 |
| 5,695,129 A | | 12/1997 | Korus ........................... 239/729 |
| 5,862,997 A | | 1/1999 | Reinke ......................... 239/728 |
| 5,927,603 A | | 7/1999 | McNabb ........................ 239/63 |
| 5,947,393 A | | 9/1999 | Unruh ........................... 239/729 |
| 6,007,004 A | * | 12/1999 | Unruh ........................... 239/729 |
| 6,036,121 A | | 3/2000 | Gerdes .......................... 239/728 |
| 6,042,031 A | * | 3/2000 | Christensen et al. ........ 239/729 |
| 6,045,065 A | | 4/2000 | Gerdes .......................... 239/729 |
| 6,068,197 A | | 5/2000 | Tolson ............................. 239/1 |
| 6,085,999 A | | 7/2000 | Gerdes et al. ............... 239/729 |
| 6,095,439 A | | 8/2000 | Segal et al. .................. 239/729 |

* cited by examiner

*Primary Examiner*—Michael Mar
*Assistant Examiner*—Thach H Bui
(74) *Attorney, Agent, or Firm*—Howard & Howard

(57) ABSTRACT

An irrigation system for conveying a fluid is provided. The irrigation system comprises a first irrigator span having a first end and extending to a distal end. A first drive system moves the first irrigator span. A second irrigator span extends from the distal end of the first irrigator span. A second drive system moves the second irrigator span. An alignment mechanism interconnects the first irrigator span and the second irrigator span to maintain alignment between the first and second irrigator spans within a predetermined limit. One of the drive systems is variable speed and the alignment mechanism includes a potentiometer for measuring the magnitude of misalignment between the first and second irrigator spans. The potentiometer is used to vary the speed of one of the drive systems to realign the first and second irrigator spans to maintain the predetermined limit.

22 Claims, 6 Drawing Sheets

IRRIGATION SYSTEM WITH VARIABLE SPEED DRIVE SYSTEM

BACKGROUND OF THE INVENTION

1. Field of the Invention

The present invention relates to an irrigation system for conveying a fluid from a fluid source through interconnected spans wherein an alignment mechanism maintains alignment of the respective spans.

2. Description of the Prior Art

The irrigation system to which the present invention pertains includes a series of irrigator spans having conduits for conveying water. The primary type of irrigation system used for this purpose is called a center pivot irrigation system. Such systems include a center pivot tower about which the entire system will rotate. The center pivot tower is connected to the water source for supplying the water to the irrigation system. The irrigation system further includes a series of irrigator spans having conduits for conveying the water. Each irrigator span is connected to the adjacent irrigator span in an end-to-end manner at a joint that may include a ball and socket connection or simply a tongue and pin connection. A coupling is used to connect the conduits of adjoining irrigator spans such that each conduit is in fluid communication with the next. The conduit of the irrigator span positioned adjacent to the center pivot tower is connected to the center pivot tower and the water source. The water is pumped from the water source through the conduits of each irrigator span and is applied to the field through discharge nozzles mounted to the conduits. The irrigation system may include several irrigator spans capable of reaching tens to hundreds of acres of the field, or the irrigation system may only include only a few irrigator spans capable of reaching only a few acres. The irrigator spans are moved about the center pivot tower by a drive system. Each irrigator span includes its own drive system for moving the span radially about the center pivot tower. In prior art irrigation systems, an alignment mechanism interconnects each pair of connected irrigator spans near the joint to maintain radial alignment between the irrigator spans within a predetermined limit.

For example, U.S. Pat. No. 4,034,778 to Sage et al. granted Jul. 12, 1977 discloses an irrigation system for conveying a fluid from a fluid source. The prior art irrigation system includes a first irrigator span having a first end at a water source and extending to a distal end. A first drive system moves the first irrigator span. The first drive system may be a constant speed or variable speed drive system. A second irrigator span extends from the distal end of the first irrigator span and a second drive system moves the second irrigator span. An alignment mechanism interconnects the first irrigator span and the second irrigator span for maintaining alignment between the first irrigator span and the second irrigator span within a predetermined limit. The alignment mechanism of the '778 patent to Sage et al. includes a strain gauge that measures the deformation of an alignment bar interconnecting the first irrigator span and the second irrigator span. An output signal is sent to the first drive system to vary the speed of the first drive system in response to flexure or strain of the alignment bar to maintain the alignment between the first and second irrigator spans. A disadvantage of the alignment mechanism used in the '778 patent to Sage et al. is the flexure or strain placed on the alignment bar. Strain results in a weaker structural integrity and over time the alignment bar of the '778 patent will become permanently deflected giving rise to erroneous results or constant servicing.

Similarly, U.S. Pat. No. 3,823,730 to Sandstrom et al. granted Jul. 16, 1974 discloses an irrigation system having a first and second irrigator span, a first and second drive system coupled to the corresponding irrigator spans, and an alignment mechanism. The alignment mechanism of the '730 patent to Sandstrom et al. includes an alignment bar, but instead of a strain gauge, as in the '778 patent to Sage et al., a potentiometer is attached to the alignment bar to measure the alignment between the first and second spans. The potentiometer sends an output signal to a control network. The control network assesses the direction of travel of the irrigation system and the alignment of the irrigation system to determine whether to send or interrupt power to the first drive system. The first drive system is a constant speed drive system and depending on the output signal sent from the potentiometer, the first drive system is activated, deactivated, or maintained in its present condition. Hence, the output signal from the potentiometer is treated as a digital signal such that one range of variable signals corresponds to a (−1) output and a second range of variable signals corresponds to a (+1) output. The first drive system is thereby activated or deactivated in response to the (−1) and (+1) outputs. A disadvantage of the irrigation system of the '730 patent to Sandstrom et al. is the stress placed on the irrigation system as a result of starting and stopping (activating and deactivating) the first drive system. In addition, the first drive system requires a high rush of energy to begin motion, thus consuming a massive amount of energy while moving through the field. Consequently, water from the irrigation system is unevenly and insufficiently applied resulting in uneven crop yields. Certain areas of the field are properly irrigated and receive adequate amounts of water while other areas are underserved.

Agricultural crop production has seen incredible advances in technology over the last twenty-five years. Farmers and agribusiness men and women rely on technology to increase production and profitability of cash-crop operations. New improvements in providing weed and pest protection have played a significant role in increasing production and profitability. Accordingly, irrigation system manufacturers have struggled to develop irrigation technology that enables large cash-crop enterprises to provide water for irrigation, fertilizer, and weed and pest protection at a significant cost savings. Traditionally, crop dusters and conventional, tractor-pulled applicators are used to spray chemicals and apply fertilizers on fields. The man-hours required to spray a field using a tractor and an applicator and the cost to use a crop duster are significant.

Current irrigation technology, however, lacks the precision and ability to apply standard chemical application rates. Either the irrigation system doesn't move fast enough to apply the standard rate, or the uneven, unbalanced movement of the irrigator system results in unevenly applied, and therefore, wasted chemicals. For instance, the typical thirteen hundred foot irrigation system disperses, at a minimum, four thousand gallons per acre, which is suitable for strictly water irrigation. However, chemicals such as fungicides require an application of between five hundred to one thousand gallons per acre. The stopping and starting motion of the irrigation system significantly slows the overall movement of the system, preventing conventional irrigation systems from being used in chemical application.

As a result, there is a need in the art for an irrigation system designed to overcome the prior art problems associated with applying water and chemicals to a field. More specifically, there is a need for a faster, continuous motion irrigation system that does not rely on straining structural members to maintain the alignment between the irrigator spans. A faster moving system would significantly improve water and chemical application precision. Furthermore, a system that does not rely on stopping and starting the drive systems to maintain the alignment within the predetermined limit could be utilized to apply weed and pest control chemicals. A faster system, combined with a uniformly moving system would be capable of applying standard chemical rates, and also provide better and more efficient water irrigation.

SUMMARY OF THE INVENTION AND ADVANTAGES

The present invention provides an irrigation system for conveying a fluid from a fluid source. The irrigation system includes a first irrigator span having a first end at the fluid source and extending to a distal end. A first drive system moves the first irrigator span. A second irrigator span extends from the distal end of the first irrigator span and a second drive system moves the second irrigator span. An alignment mechanism interconnects the first irrigator span and the second irrigator span to maintain alignment between the first irrigator span and the second irrigator span within a predetermined limit. The system is characterized by one of the drive systems being variable speed and the alignment mechanism including a potentiometer for measuring the magnitude of misalignment between the first and second irrigation spans for varying the speed of one of the drive systems. The speed of one of the drive systems is varied to realign the first irrigator span and the second irrigator span to maintain the predetermined limit.

The subject invention exhibits many advantages over the prior art. The primary advantage is the elimination of the need to start and stop the drive systems responsible for moving the irrigator spans to maintain the predetermined limit. The subject invention relies on the potentiometer to measure the magnitude of misalignment and to vary the speed of one of the drive systems accordingly. The present invention further provides the capability to spray chemicals such as herbicides and pesticides to a field using an irrigation system. The prior art fails to provide an irrigation system that maintains a steady pace around the field during chemical application. Furthermore, the alignment mechanism of the subject invention does not require straining any structural members interconnecting the first and second irrigator spans, resulting in a longer life and better alignment.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, an irrigation system for conveying a fluid from a fluid source is generally shown at 10. The irrigation system 10 of the present invention can be used for a multitude of purposes. Therefore, it is to be understood that the fluid could include many different substances. The fluid could be water for irrigating crops in a field. The fluid could also be a mixture of water and chemicals for controlling pests such as insects and fungi or for controlling weeds such as grasses, thistle, ragweed, nightshade, cocklebur, and so on. The irrigation system 10 could also be used to apply fertilizers to the field. The use of the present invention is not intended to limit the present invention.

Figure 1:
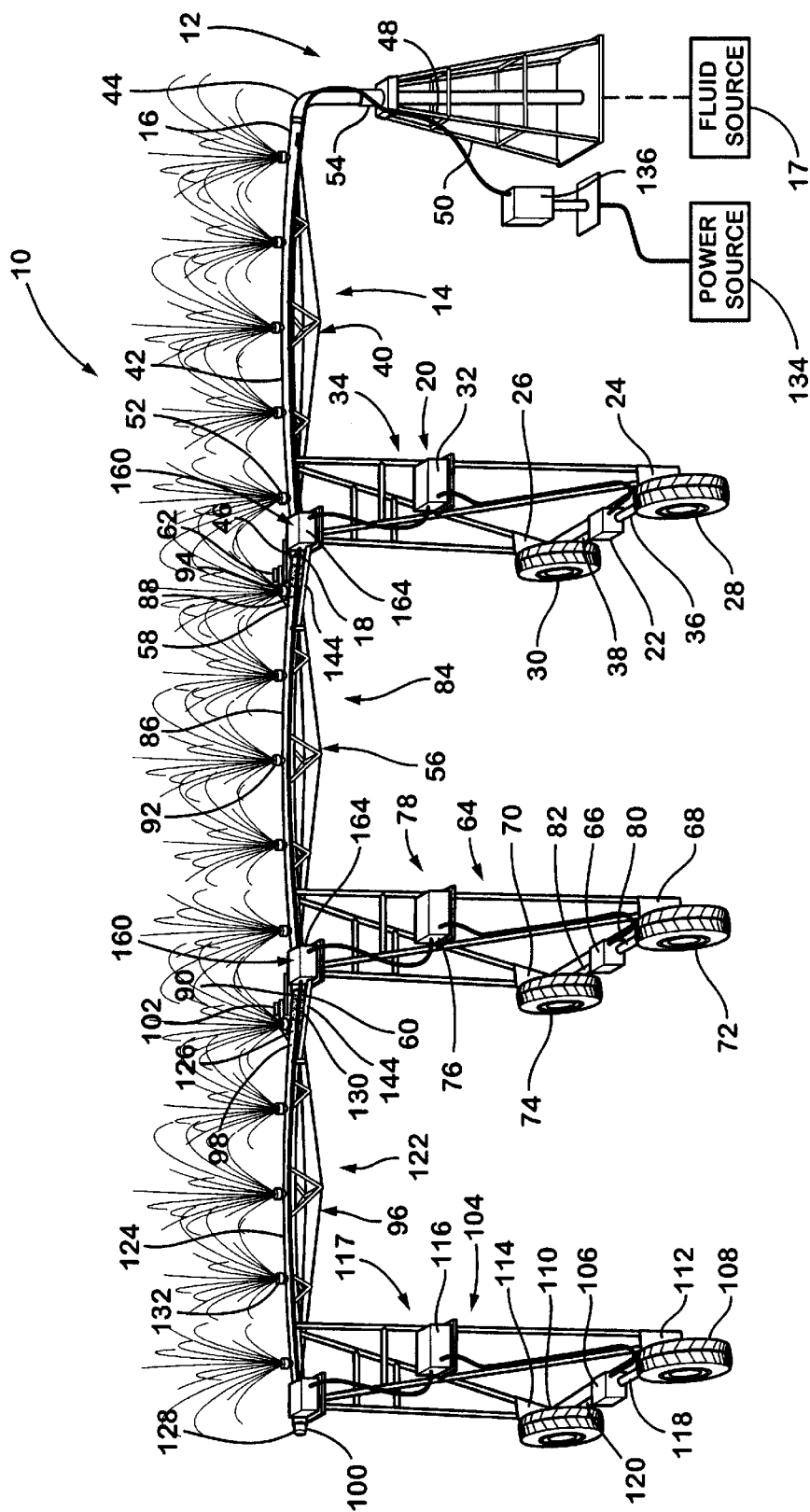
FIG. 1 is a perspective view of an irrigation system embodying the present invention.
Figure 2:
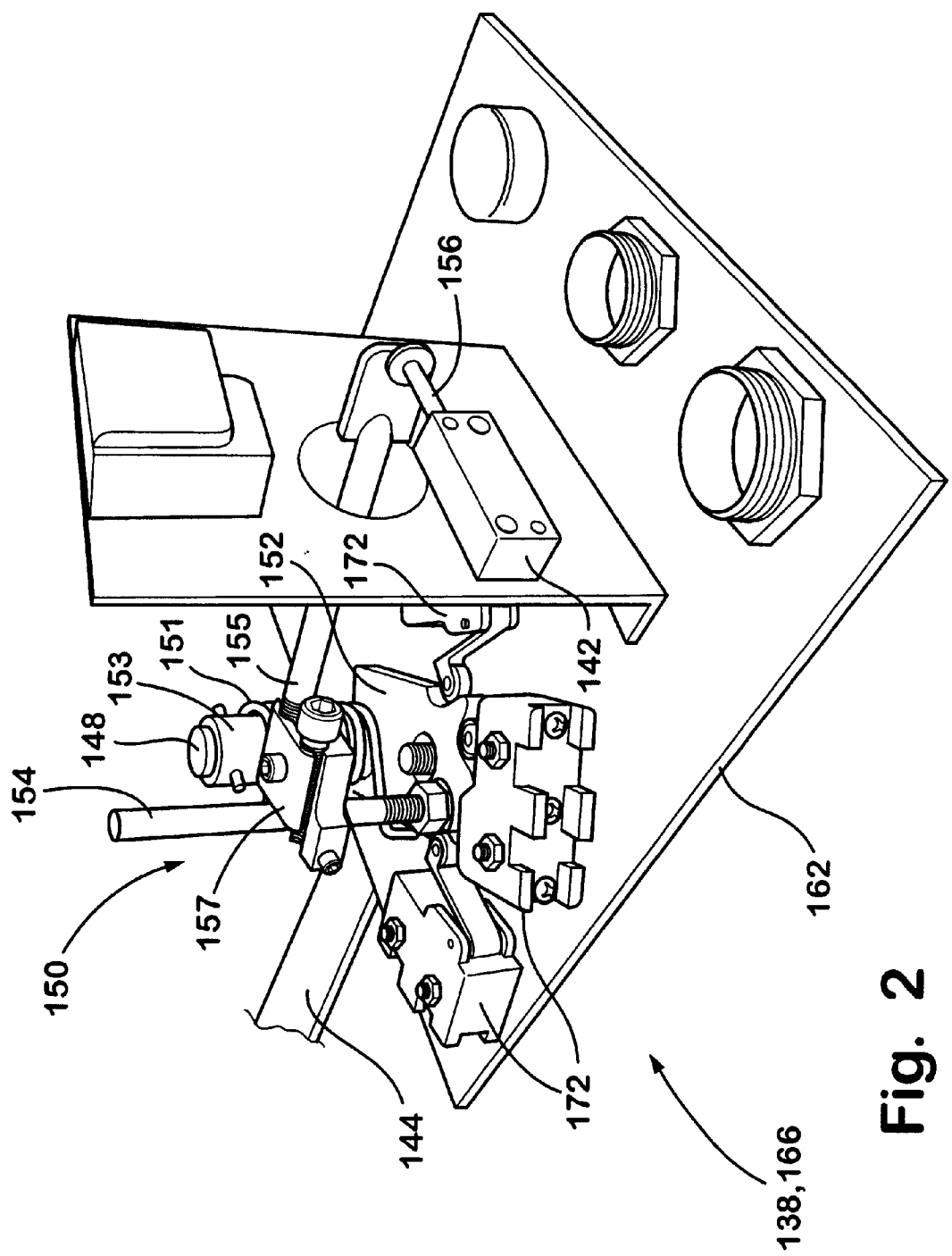
FIG. 2 is a perspective view of an actuator assembly.

Referring to FIG. 1, in the preferred embodiment of the present invention, the irrigation system 10 rotates about a center pivot tower 12. Such a system is traditionally termed a center pivot irrigation system.

The irrigation system 10 includes a first irrigator span 14 having a first end 16 at the center pivot tower 12. In the preferred embodiment, the center pivot tower 12 is adjacent to the fluid source 17. The fluid source 17 may be a tank containing chemicals or fertilizers, a water source, and so on. The first irrigator span 14 extends from the first end 16 to a distal end 18. A first drive system 20 moves the first irrigator span 14 radially about the center pivot tower 12. The first drive system 20 comprises a first drive motor 22, a first pair of gearboxes 24, 26, two drive wheels 28, 30 and a variable frequency drive module 32 to control the speed of the first drive motor 22. The first drive motor 22 is mounted to a first drive tower 34 that supports the first drive system 20. The first pair of gearboxes 24, 26, each coupled to a drive wheel 28, 30, are positioned on opposite sides of the first drive motor 22 and are connected to the first drive motor 22 by a first pair of drive shafts 36, 38. The variable frequency drive module 32 controls the movement of the first irrigator span 14 by varying the speed of the first drive motor 22.

The first irrigator span 14 further includes a first support structure 40 and a first conduit 42 supported by the first support structure 40. The first conduit 42 includes a first upstream and a first downstream end 44, 46. The first upstream end 44 is in fluid communication with the fluid source 17 by way of a center conduit 48 supported by a center support 50 of the center pivot tower 12. The fluid travels from the fluid source 17 through the center conduit 48 and to the first upstream end 44. A first plurality of discharge nozzles 52 are spaced along the first conduit 42 to spray the fluid from the first conduit 42 onto the field. In the preferred embodiment, a pivot coupling 54 provides a flexible connection that allows vertical and radial movement of the first irrigator span 14 relative to the center conduit 48. The pivot coupling 54 could be a rigid connection, however, the stresses on a rigid connection as the first irrigator span 14 moves around an undulating field would likely cause structural damage to the irrigation system 10.

A second irrigator span 56 extends radially from the distal end 18 of the first irrigator span 14. The second irrigator span 56 has a second end 58 and a second distal end 60. A first joint 62 connects the second end 58 to the distal end 18 of the first irrigator span 14. The first joint 62 may be a ball and socket type connection or a simple tongue and pin connection. The first joint 62 must be flexible to allow radial movement of the second irrigator span 56 relative to the first irrigator span 14. A second drive system 64 moves the second irrigator span 56 radially about the center pivot tower 12. The second drive system 64 comprises a second drive motor 66, a second pair of gearboxes 68, 70, two drive wheels 72, 74 and a second variable frequency drive module 76 to control the speed of the second drive motor 66. The second drive motor 66 is mounted to a second drive tower 78 that supports the second drive system 64. The second pair of gearboxes 68, 70, each coupled to a drive wheel 72, 74, are positioned on opposite sides of the second drive motor 66 and are connected to the second drive motor 66 by a second pair of drive shafts 80, 82. The second variable frequency drive module 76 controls the movement of the second irrigator span 56 by varying the speed of the second drive motor 66.

The second irrigator span 56 further includes a second support structure 84 and a second conduit 86 supported by the second support structure 84. The second conduit 86 includes a second upstream and a second downstream end 88, 90 wherein the second upstream end 88 is in fluid communication with the first downstream end 46 of the first conduit 42. A second plurality of discharge nozzles 92 are spaced along the second conduit 86 to spray the fluid from the second conduit 86 onto the field. A conduit coupling 94 interconnects the first conduit 42 and the second conduit 86. The conduit coupling 94 provides a flexible connection between the first conduit 42 and the second conduit 86 such that the first conduit 42 is in fluid communication with the second conduit 86.

A third irrigator span 96 having a third end 98 and a third distal end 100 extends radially from the second distal end 60. A second joint 102 connects the second distal end 60 of the second irrigator span 56 and the third end 98 in the same manner as the first joint 62. A third drive system 104 moves the third irrigator span 96 radially about the center pivot tower 12. The third drive system 104 comprises a pacing motor 106, a third pair of gearboxes 112, 114, two drive wheels 108, 110 and a third variable frequency drive module 116 to control the speed of the pacing motor 106. The pacing motor 106 is mounted to a third drive tower 117 that supports the third drive system 104. The third pair of gearboxes 112, 114, each coupled to a drive wheel 108, 110, are positioned on opposite sides of the pacing motor 106 and are connected to the pacing motor 106 by a third pair of drive shafts 118, 120. The third variable frequency drive module 116 controls the movement of the third irrigator span 96 by setting the speed of the pacing motor 106.

The third irrigator span 96 includes a third support structure 122 and a third conduit 124 supported by the third support structure 122. The third conduit 124 includes a third upstream and third downstream end 126, 128. The third upstream end 126 is in fluid communication with the second downstream end 90 of the second conduit 86 to move the fluid through the third conduit 124. A second conduit coupling 130 interconnects the second conduit 86 and the third conduit 124. A third plurality of discharge nozzles 132 are spaced along the third conduit 124 to spray the fluid from the third conduit 124 onto the field.

It is to be understood that the first, second and third irrigator spans 14, 56, 96 of the present invention are described for illustrative purposes only. The present invention could be practiced with any number of spans extending from the fluid source 17. In systems with multiple irrigator spans, all of the spans are similar, except for the last span or the span furthest extended from the fluid source 17. The third irrigator span 96 as described herein is the last span in the irrigation system 10 for illustrative purposes.

In the preferred embodiment, the irrigator spans 14, 56, 96, the support structures 40, 84, 122, the drive towers 34, 78, 117, the conduits 42, 86, 124, and the center support 50 are made from galvanized steel. Any suitable material may be used, such as, but not limited to painted steel, iron, aluminum, and so on. The conduit couplings 94, 130 of the preferred embodiment are made from a rubber polymer, but may be made from any number of materials creating a flexible connection such as, but not limited to, thermoplastic polymers, flexible plastics, and so on. The first and second drive motors 22, 66 and the pacing motor 106 of the preferred embodiment are reversible, variable speed, AC motors. It is to be understood, however, that the motors 22, 66, 106 could be DC motors, fuel-powered motors, and so on. In addition, the drive systems 20, 64, 104 could comprise a single gearbox, a single drive shaft, one drive wheel and one non-propelled support wheel. Similarly, the drive systems 20, 64, 104 could comprise separate motors for driving each of the driveshafts described above. Therefore, the configuration of the drive motors, gearboxes, driveshafts and drive wheels is not intended to limit the present invention. Any conventional configuration may be employed.

A pacing speed of the pacing motor 106 is adjusted at a main control panel 136 to a user-defined rate. Movement of the irrigation system 10 begins when a switch (not shown) connecting a power source 134 to the third drive system 104 is moved to an operative position. Power is then sent from the power source 134 to the third drive system 104. Accordingly, the third drive system 104 paces the irrigation system 10. The pacing motor 106, as previously described, is a variable speed motor, but the present invention could also be practiced using a constant speed motor to pace the irrigation system 10.

Referring to FIGS. 2–5, an alignment mechanism 138 is used to maintain the alignment between the first and second irrigator spans 14, 56 within a predetermined limit 140 as the third irrigator span 96 moves at the pacing speed.

The alignment mechanism 138, in the preferred embodiment, controls the first drive system 20 by moving the first irrigator span 14 to realign the first irrigator span 14 with the second irrigator span 56 within the predetermined limit 140. The alignment mechanism 138 includes a potentiometer 142 for measuring the magnitude of misalignment between the first and second irrigator spans 14, 56. The potentiometer 142 is connected to a power source and utilizes an analog output signal 143 to vary the speed of the first drive system 20 to realign the first irrigator span 14 and the second irrigator span 56 to maintain the predetermined limit 140. The power source for the potentiometer 142 may be the same as used to power the drive systems 20, 64, 104, or the power source may be a separate power source. The potentiometer 142 is described in greater detail below. The alignment mechanism 138 interconnects the first irrigator span 14 and the second irrigator span 56 to maintain radial alignment between the first irrigator span 14 and the second irrigator span 56 within the predetermined limit 140.

The alignment mechanism 138 includes an alignment bar 144 having a first end 146 slidably supported by the second irrigator span 56 and a second end 147 rotatably supported by the first irrigator span 14. A pivot shaft 148 is mounted to the second end 147 of the alignment bar 144. The pivot shaft 148 is rotatably supported by the first irrigator span 14 such that the pivot shaft 148 rotates relative to the first irrigator span 14 when the first and second irrigator spans 14, 56 move relative to one another. The alignment mechanism 138 also includes an actuator assembly 150 fixed to the pivot shaft 148 such that the actuator assembly 150 rotates when the pivot shaft 148 rotates. The potentiometer 142 is responsive to rotation of the actuator assembly 150 and pivot shaft 148.

The actuator assembly 150 comprises a plate 152 mounted to the pivot shaft 148 and supporting the pivot shaft 148 such that the plate 152 rotates when the pivot shaft 148 rotates. The plate 152 is mounted by way of a pin connection with a shaft housing 153 that is integral with the plate 152. The pin connection secures the pivot shaft 148 within the shaft housing 153. A spring 151 maintains a constant force on the plate 152 to reduce unnecessary movement of the plate 152. The actuator assembly 150 further includes a post 154 mounted to the plate 152 and an actuator arm 155 mounted to the post 154 via a shaft coupling 157 to actuate the potentiometer 142. The potentiometer 142 includes a signal arm 156 contacting the actuator arm 155. The output signal 143 of the potentiometer 142 varies as the signal arm 156 is moved by the actuator arm 155 in response to rotation of the pivot shaft 148. Any number of configurations could be used to actuate the potentiometer 142 as the alignment between the first and second irrigator spans 14, 56 varies. In other words, although the alignment bar 144, the pivot shaft 148, and the actuator assembly 150 are used to actuate the potentiometer 142 and generate a variable output signal 143, any configuration may be used to actuate the potentiometer. Such configurations may include a firm member mounted to one of the irrigator spans and including a rotary potentiometer responsive to the movement of another irrigator span. The assembly used to actuate the potentiometer 142 is not intended to limit the present invention.

Figure 5:
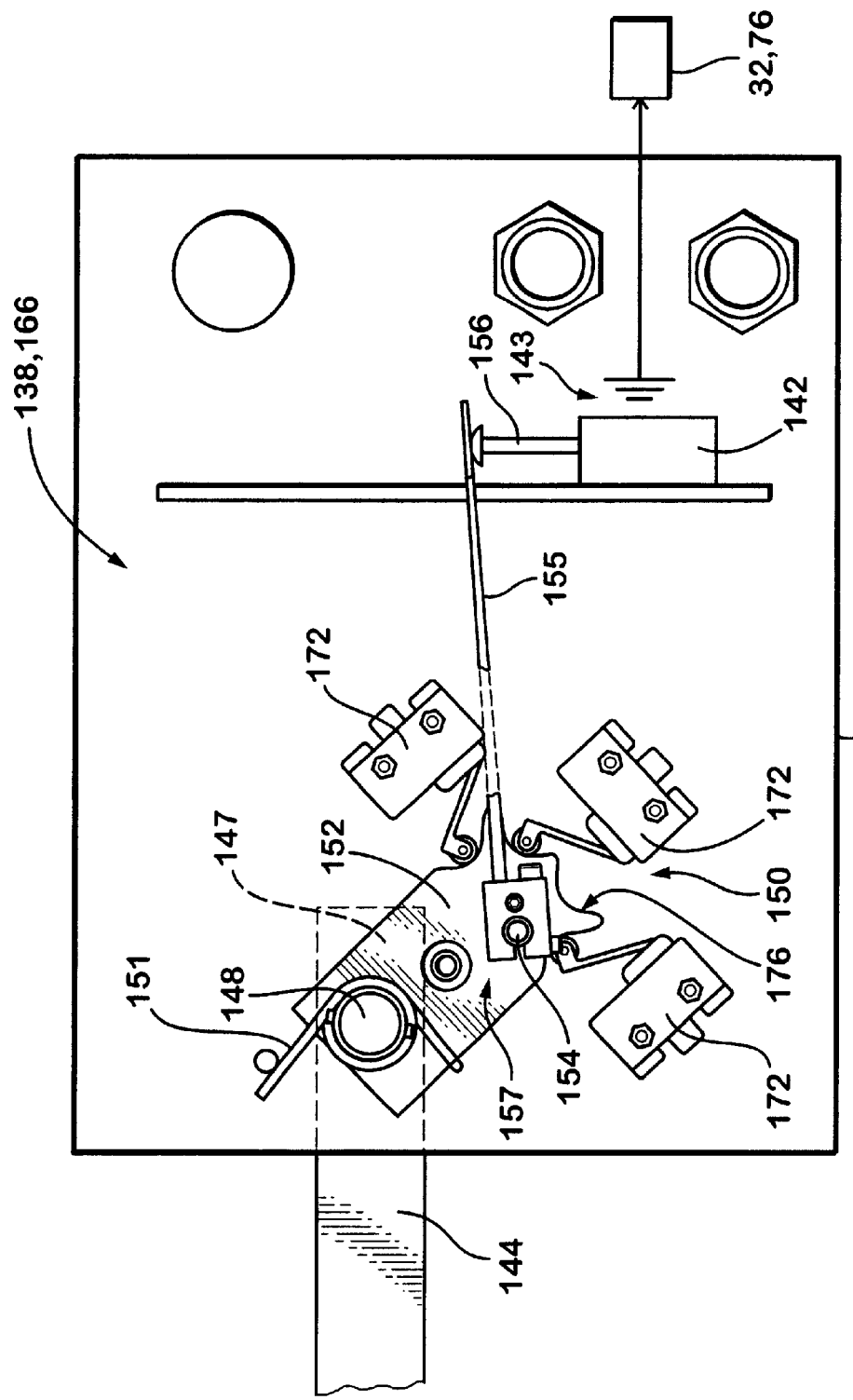
FIG. 5 is a top view of an alignment mechanism embodying the present invention.
Figure 6:
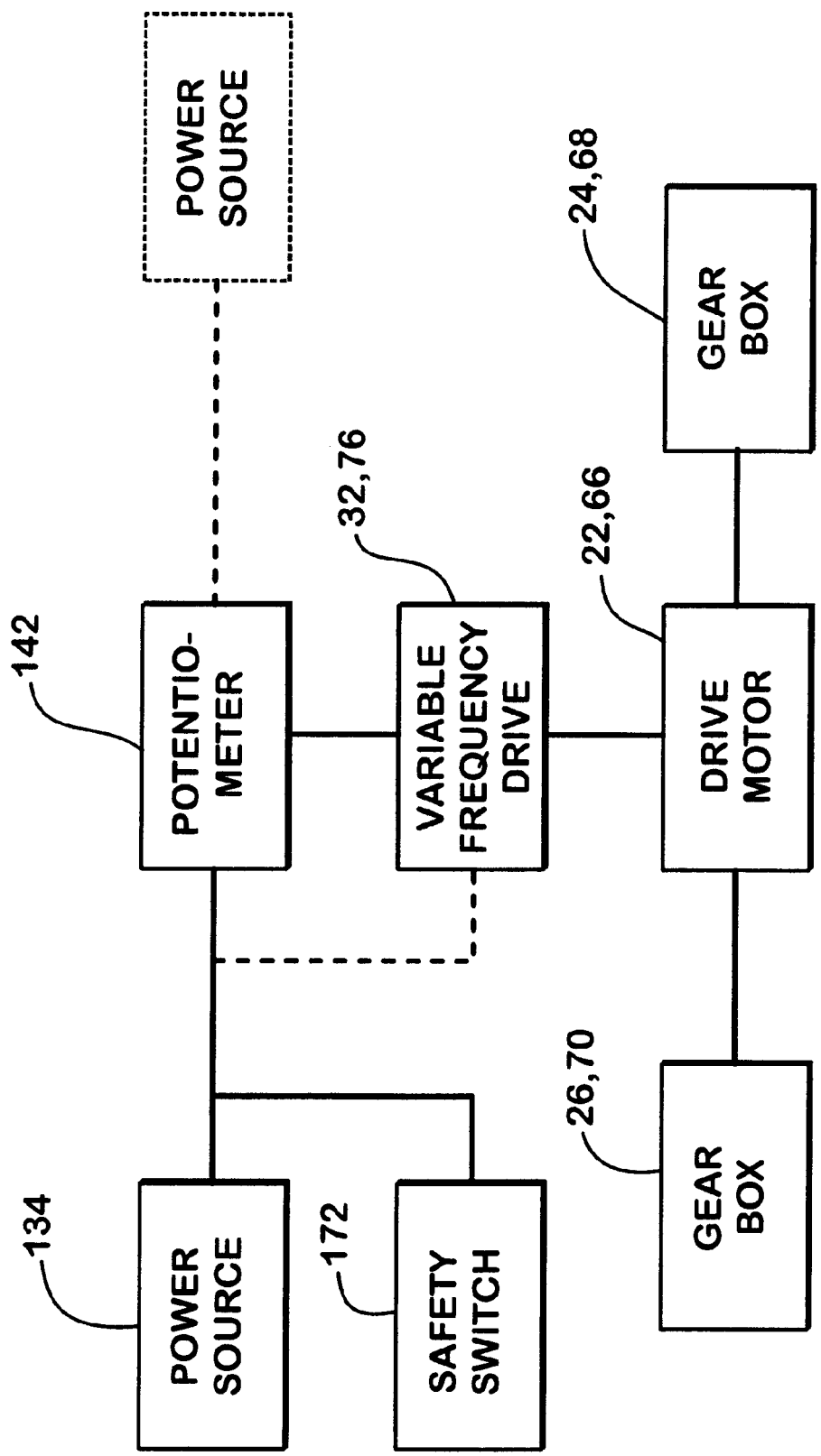
FIG. 6 is a block diagram illustrating the connectivity of a drive system.

The output signal 143 from the potentiometer 142 is sent to the variable frequency drive module 32, as illustrated in FIGS. 5 and 6. The variable frequency drive module 32 varies the speed of the first drive motor 22 based on the output signal 143 received from the potentiometer 142. In other words, as the output signal 143 varies, the speed of the first drive motor 22 varies. In the preferred embodiment, the potentiometer 142 is a 10,000 Ohm, single-wiper, slider potentiometer. It is to be understood that any number of potentiometers can be employed, including, but not limited to, dual-wiper or dual directional potentiometers, rotary potentiometers, and so on. For illustrative purposes, the single wiper, slider potentiometer 142 will be described below.

A forward/reverse relay (not shown) is used to change the direction of the irrigation system 10 by controlling the power supplied to the irrigation system 10. When the forward/reverse relay is in a forward position, the irrigation system 10 moves clockwise about the center pivot tower 12 and the first and second drive motors 22, 66 and pacing motor 106 move their associated irrigator spans 14, 56, 96 accordingly. Alternatively, when the forward/reverse relay is in a reverse position, the irrigation system 10 moves counterclockwise about the center pivot tower 12. In the forward position, the variable frequency drive module 32 is programmed to vary the speed of the first drive motor 22 when the potentiometer 142 is acting within the 5,000–10,000 Ohm range. Alternatively, in the reverse position, the variable frequency drive module 32 is programmed to vary the speed of the first drive motor 22 when the potentiometer 142 is acting within the 0–5,000 Ohm range. In both directions, when the potentiometer 142 is not acting within the specified ranges, power to the first drive system 20 is discontinued.

Figure 4:
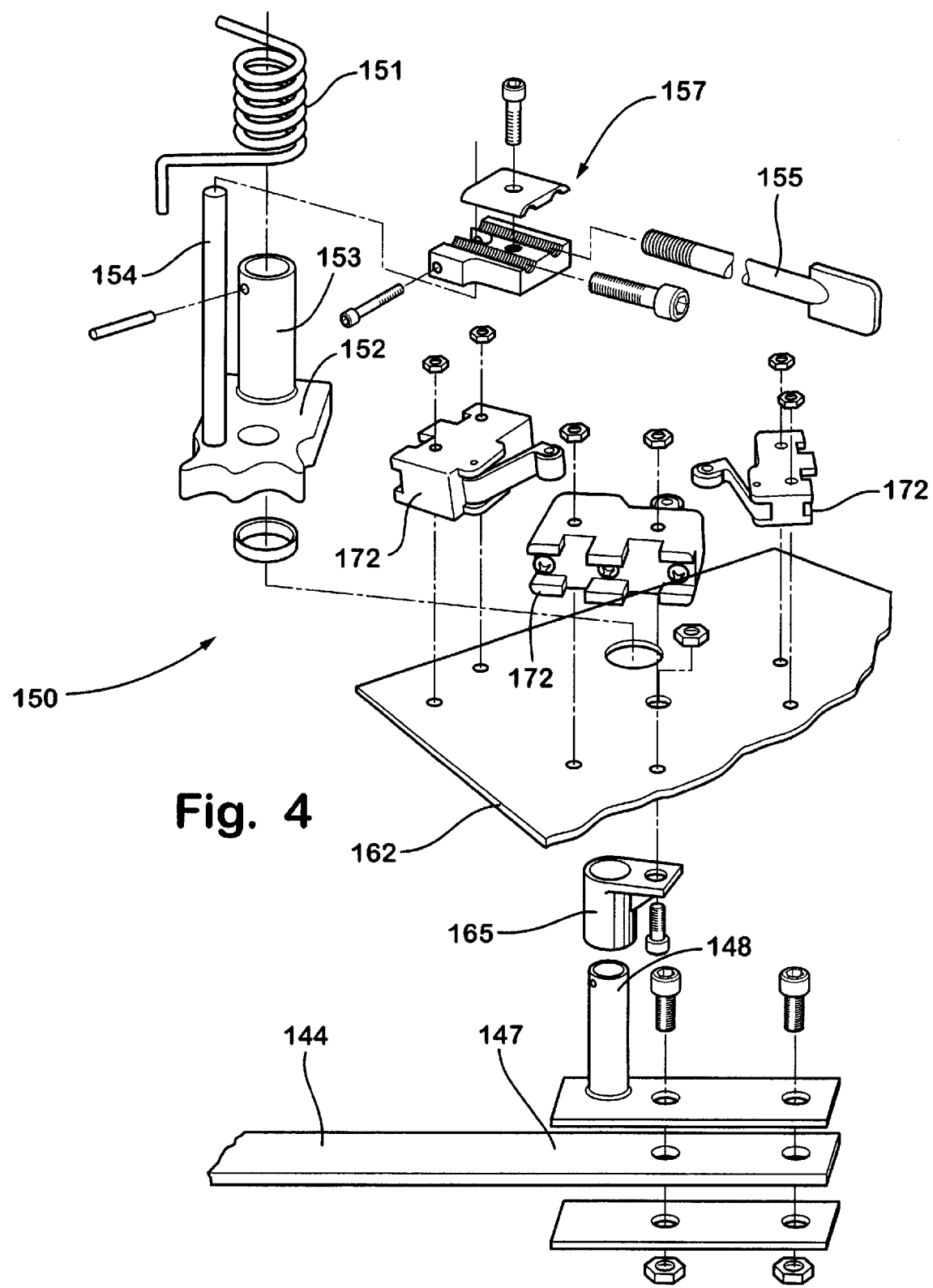
FIG. 4 is an exploded view of the actuator assembly and a safety switch.

The potentiometer 142 and the actuator assembly 150 are disposed in a control box 160 in the preferred embodiment. The control box 160 comprises a base plate 162 mounted to the first and second irrigator spans 14, 56 and a control box cover 164 fastened to the base plate 162. The pivot shaft 148 penetrates the base plate 162 and rotates relative to the base plate 162 as the irrigator spans 14, 56, 96 move relative to one another. The base plate 162 is positioned between the alignment bar 144 and the plate 152 in the preferred embodiment. A bored support 165 mounted to the base plate 162 pivotally houses the pivot shaft between the base plate 162 and the alignment bar 144 and the plate 152 supports the pivot shaft 148 above the base plate 162, as shown in FIG. 4.

A second alignment mechanism 166, similar to the first, maintains the alignment between the second and third irrigator spans 56, 96 within a predetermined limit 168 as the third irrigator span 96 moves at the pacing speed.

Referring to FIG. 5, the second alignment mechanism 166 is the same as described for the alignment mechanism 138 above. Therefore, the same numerals will be used when referring to the features of both the alignment mechanisms 138, 166. The only difference between the alignment mechanisms 138, 166 is that the alignment mechanism 138 above maintains the alignment of the first and second irrigator spans 14, 56 within the predetermined limit 140, while the second alignment mechanism 166 maintains the alignment of the second and third irrigator spans 56, 96 within the predetermined limit 168. In the preferred embodiment, the predetermined limits 140, 168 are substantially similar for both alignment mechanisms 138, 166, however, the preferred embodiment could be practiced such that different predetermined limits 140, 168 are set.

Figure 3:
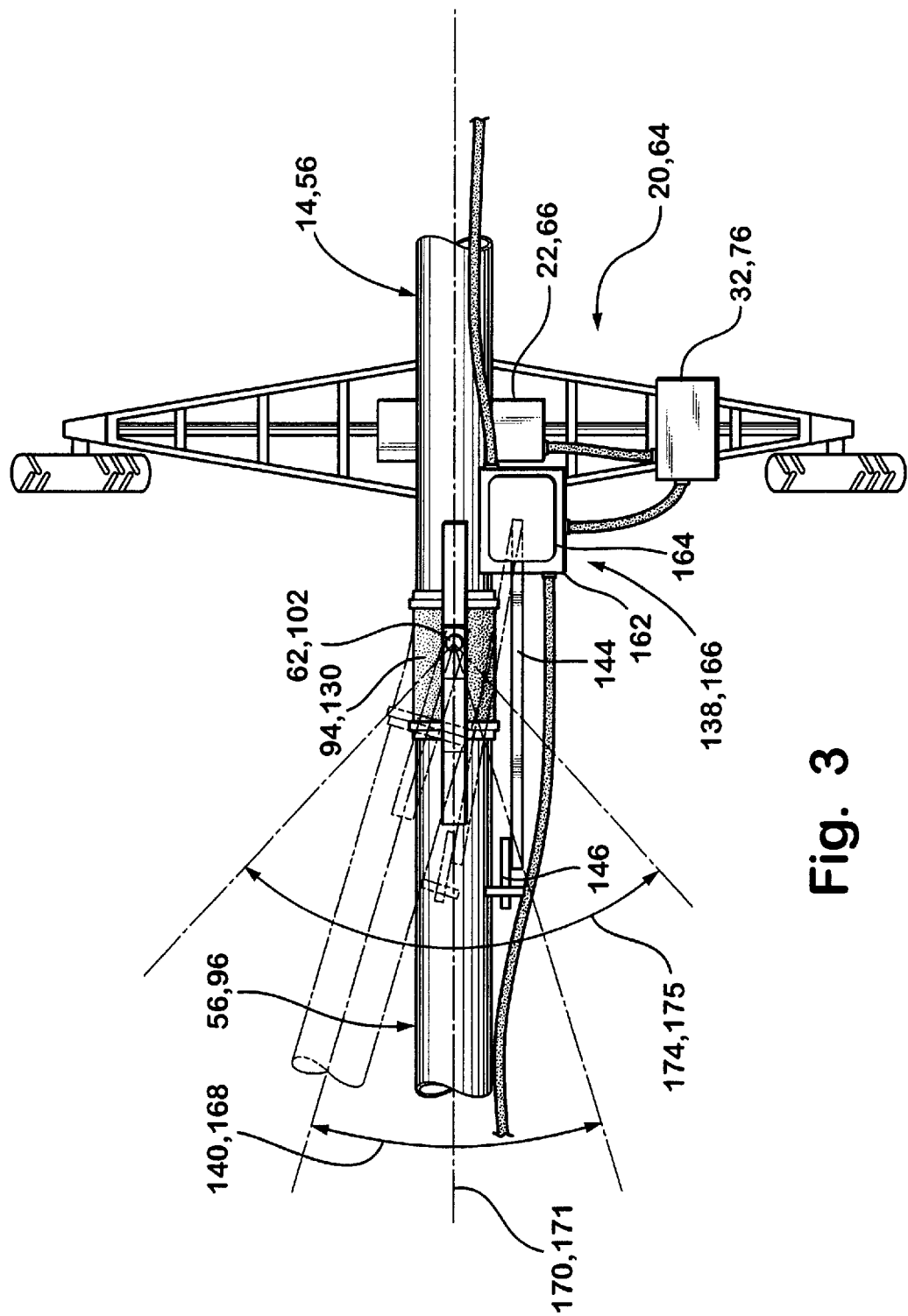
FIG. 3 is a top view of two irrigator spans and a joint therebetween illustrating predetermined limits between the irrigator spans.

Referring to FIG. 3, the predetermined limits 140, 168 are established as the degree of rotation from a preset alignment 170, 171 that the irrigator spans 14, 56, 96 are allowed to deviate without discontinuing power to the first or second drive systems 20, 64. The preset alignment 170 between the first and second irrigator spans 14, 56 is substantially similar to the preset alignment 171 between the second and third irrigator spans 56, 96. The present invention, however, may be practiced such that the preset alignments 170, 171 are different. The first and second drive systems 20, 64 run continuously as long as the first and second drive systems 20, 64 maintain the alignment of the irrigator spans 14, 56, 96 within the predetermined limits 140, 168. The alignment mechanism 138 in the preferred embodiment is set such that when the potentiometer 142 is at 5,000 Ohms the alignment of the first irrigator span 14 relative to the second irrigator span 56 is at the preset alignment 170.

As set forth above, the alignment mechanism 138 controls the first drive system 20 and the second alignment mechanism 166 controls the second drive system 64. Alternatively, the alignment mechanism 138 could control the second drive system 64 and the second alignment mechanism 166 could control the first drive system 20. The connections between drive systems 20, 64 and alignment mechanisms 138, 166 is not intended to limit the present invention. It should be noted that the last span, the third span 96 as described herein, does not require an alignment mechanism 138, 166.

The power source 134 provides power to each of the drive systems 20, 64, 104 and each drive system 20, 64, 104 includes at least one safety switch 172 to shut off power to all of the drive systems 20, 64, 104. More than one switch, as shown in FIG. 5, could be employed. The power is shut off if the radial alignment between the first and second irrigator spans 14, 56 or between the second and third irrigator spans 56, 96 falls out of a second predetermined limit 174, 175. The second predetermined limit 174 for the first and second irrigator spans 14, 56 and the second predetermined limit 175 between the second and third irrigator spans 56, 96 may be different, but in the preferred embodiment, they are substantially similar. For both alignment mechanisms 138, 166, the plate 152 of the actuator assembly 150 includes a cam surface 176 that is profiled to actuate the safety switch 172 when the radial alignment between the spans 14, 56, 96 falls out of the second predetermined limit 174, 175. The second predetermined limit 174, 175 is set such that structural damage may occur if the alignment between the spans 14, 56, 96 is out of the second predetermined limit 174, 175.

An alternative embodiment includes all of the elements of the preferred embodiment, except that the alternative embodiment does not include a center pivot tower 12. The irrigation system 10 of the alternative embodiment operates the same as the preferred embodiment, but the irrigation system 10 of the alternative embodiment moves linearly along the field, not radially about the center pivot tower 12. Therefore, the fluid source 17 in the alternative embodiment moves with the irrigation system 10 and is connected directly to the first conduit 42. In other words, the fluid source 17 does not travel through the center conduit 48 before entering the first conduit 42.

The operation of the irrigation system 10 of the preferred embodiment will now be described as though the irrigation system 10 is at rest and at the preset alignment 170. The pacing speed of the pacing motor 106 is adjusted to the user-defined rate and movement of the irrigation system 10 begins when the switch connecting the power source 134 to the third drive system 104 is moved to the operative position. Power is sent from the power source 134 to the third drive system 104. The third drive system 104 paces the irrigation system 10. The pacing motor 106 as previously described, is a reversible, variable speed, AC motor.

The third irrigator span 96 begins to move and pivot about the second joint 102. When the third irrigator span 96 pivots about the second joint 102 and falls out of the preset alignment 170, the second alignment mechanism 166 is actuated. More specifically, the alignment bar 144 causes the pivot shaft 148 to rotate the actuator assembly 150. The actuator assembly 150 thereby actuates the signal arm 156 of the potentiometer 142 and the output signal 143 is sent to the second variable frequency drive module 76. The second variable frequency drive module 76 starts movement of the second drive motor 66.

The alignment mechanism 138 operating between the first and second irrigator spans 14, 56 acts in the same manner as the second irrigator span 56 pivots about the first joint 62 relative to the first irrigator span 14. Only the action between the second and third irrigator spans 56, 96 will be discussed in greater detail.

The second variable frequency drive module 76 varies the speed of the second drive system 64 as the output signal 143 varies. The output signal 143 and speed increases as the alignment falls further from the preset alignment 170. Conversely, the output signal 143 and speed decreases as the alignment approaches the preset alignment 170. Power is discontinued to the second drive motor 66 if the alignment between the second and third irrigator spans 56, 96 falls out of the predetermined limit 168. Test runs, however, show that power is continually sent to the second drive motor 66 as the irrigation system 10 rotates about the center pivot tower 12. Stated another way, the second drive system 64 is continually attempting to reach the preset alignment 170, but as the preset alignment 170 is approached, the speed decreases. In this manner the second drive system 64 reaches a pseudo steady-state, allowing the second drive motor 66 to continually operate to move the second irrigator span 56. Power is discontinued to all of the drive systems 20, 64, 104 if the alignment between the second and third drive systems 64, 104 falls out of the second predetermined limit 175. The variable frequency drive module 32, the alignment mechanism 138 and the first drive system 20 operate in the same manner. FIG. 6 generally shows the how the power source 134, the potentiometer 142, and the first or second drive systems 20, 64 are interconnected.

The fluid from the fluid source 17 is pumped through each of the conduits 42, 86, 124 and discharged to the field by way of the discharge nozzles 52, 92, 132 as the irrigation system 10 pivots about the center pivot tower 12 and maintains the alignment between the irrigator spans 14, 56, 96 within the predetermined limits 140, 168, 174, 175.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. An irrigation system for conveying a fluid from a fluid source, said system comprising;
    a first irrigator span having a first end and extending to a distal end,
    a first drive system for moving said first irrigator span,
    a second irrigator span extending from said distal end of said first irrigator span,
    a second drive system for moving said second irrigator span,
    an alignment mechanism interconnecting said first irrigator span and said second irrigator span for maintaining alignment between said first irrigator span and said second irrigator span within a predetermined limit,
    said system characterized by one of said drive systems being variable speed and said alignment mechanism including a potentiometer for measuring the magnitude of misalignment between said first and second irrigator spans to vary the speed of one of said drive systems to realign said first irrigator span and said second irrigator span to maintain said predetermined limit.

2. The system as set forth in claim 1 wherein said potentiometer generates an analog output signal that varies as the magnitude of misalignment between the irrigator spans varies to vary the speed of the one of said drive systems in proportion to the magnitude of misalignment between the irrigator spans.

3. The system as set forth in claim 1 wherein said alignment mechanism further includes an alignment bar having a first end slidably supported by said second irrigator span and a second end being rotatably supported by said first irrigator span.

4. The system as set forth in claim 3 wherein said alignment mechanism further includes a pivot shaft mounted to said second end of said alignment bar.

5. The system as set forth in claim 4 wherein said pivot shaft is rotatably supported by said first irrigator span such that when said first and second irrigator spans move relative to one another said pivot shaft rotates relative to said first irrigator span.

6. The system as set forth in claim 5 wherein said alignment mechanism further includes an actuator assembly fixed to said pivot shaft such that said actuator assembly rotates when said pivot shaft rotates.

7. The system as set forth in claim 6 wherein said potentiometer is responsive to rotation of said actuator assembly.

8. The system as set forth in claim 6 wherein said actuator assembly further includes a plate mounted to said pivot shaft such that said plate rotates when said pivot shaft rotates.

9. The system as set forth in claim 8 further including a power source providing power to said first drive system and a safety switch in communication with said first drive system for shutting off the power to said first drive system.

10. The system as set forth in claim 9 wherein said plate further includes a cam surface that is profiled to actuate said safety switch when the alignment of said first and second irrigator spans falls out of a second predetermined limit.

11. The system as set forth in claim 8 wherein said actuator assembly further includes a post mounted to said plate and an actuator arm mounted to said post for actuating said potentiometer.

12. The system as set forth in claim 11 wherein said potentiometer includes a signal arm for contacting said actuator arm such that said output signal of said potentiometer varies relative to the movement of said signal arm by said actuator arm in response to rotation of said pivot shaft.

13. The system as set forth in claim 6 further including a control box having a base plate mounted to said first irrigator span and a control box cover fastened to said base plate, said potentiometer and said actuator assembly being disposed within said control box.

14. The system as set forth in claim 2 wherein said first drive system further includes a first drive motor and a variable frequency drive module for controlling the speed of said first drive motor in response to said output signal from said potentiometer.

15. The system as set forth in claim 1 wherein said second irrigator span includes a second distal end and a third irrigator span extends from said second distal end of said second irrigator span.

16. The system as set forth in claim 15 further including a third drive system having a pacing motor for moving said third irrigator span.

17. The system as set forth in claim 16 further including a main control panel in communication with said third drive system for setting the speed of said pacing motor such that said third drive system paces said irrigation system and said first irrigator span moves to realign said first irrigator span and said second irrigator span to maintain said predetermined limit.

18. The system as set forth in claim 1 wherein said first irrigator span further includes a first support structure and a first conduit supported by said first support structure, said first conduit having a first upstream end and a first downstream end wherein said first upstream end is in fluid communication with the fluid source such that the fluid enters said first conduit from said first upstream end and travels through said first conduit to said first downstream end.

19. The system as set forth in claim 18 wherein said second irrigator span further includes a second support structure and a second conduit supported by said second support structure, said second conduit having a second upstream end and a second downstream end wherein said second upstream end is in fluid communication with said first downstream end of said first conduit.

20. The system as set forth in claim 19 further including a conduit coupling interconnecting said first conduit and said second conduit such that said first conduit is in fluid communication with said second conduit.

21. The system as set forth in claim 20 further including a center pivot tower having a center support and a center conduit, said center conduit being coupled to said first upstream end of said first conduit for channeling the fluid from the fluid source to said first conduit.

22. An irrigation system, comprising;
   a first irrigator span having a first end and extending to a distal end,
   a first drive system including a variable frequency drive module and a variable speed drive motor for moving said first irrigator span,
   a second irrigator span extending from said distal end of said first irrigator span,
   a second drive system for moving said second irrigator span,
   an alignment mechanism including an alignment bar interconnecting said first irrigator span and said second irrigator span for maintaining horizontal alignment between said first irrigator span and said second irrigator span within a predetermined limit,
   said alignment mechanism including a potentiometer for measuring the magnitude of misalignment between said first and second irrigator spans and transmitting an output signal to said variable frequency drive module to vary the speed of said variable speed drive motor in proportion to the output signal to realign said first irrigator span and said second irrigator span within the predetermined limit, and
   said potentiometer having a signal arm movably responsive to pivotal movement of said alignment bar to generate the output signal wherein the output signal varies as the magnitude of misalignment varies.

* * * * *